(12) United States Patent
Stephens

(10) Patent No.: US 7,522,334 B2
(45) Date of Patent: Apr. 21, 2009

(54) OPTICAL COMMUNICATION SYSTEMS INCLUDING OPTICAL AMPLIFIERS AND AMPLIFICATION METHODS WITH FLAT NOISE FIGURE PROFILE

(75) Inventor: Thomas D. Stephens, Brighton (AU)

(73) Assignee: Corvis Equipment Corporation, Austin, TX (US)

( * ) Notice: Subject to any disclaimer, the term of this patent is extended or adjusted under 35 U.S.C. 154(b) by 0 days.

(21) Appl. No.: 11/804,100

(22) Filed: May 17, 2007

(65) Prior Publication Data
US 2008/0074732 A1    Mar. 27, 2008

Related U.S. Application Data

(62) Division of application No. 11/061,579, filed on Feb. 18, 2005, now abandoned.

(60) Provisional application No. 60/546,108, filed on Feb. 19, 2004.

(51) Int. Cl.
H04B 10/17    (2006.01)
H04B 10/12    (2006.01)

(52) U.S. Cl. .............. 359/337.1; 359/334; 359/337.21; 359/337.4

(58) Field of Classification Search .............. 359/337.1, 359/337.4, 334, 337.21
See application file for complete search history.

(56) References Cited

U.S. PATENT DOCUMENTS

| | | | |
|---|---|---|---|
| 5,920,424 A * | 7/1999 | Espindola et al. ...... | 359/337.21 |
| 5,959,750 A | 9/1999 | Eskildsen et al. | |
| 6,115,174 A | 9/2000 | Grubb et al. | |
| 6,236,487 B1 | 5/2001 | Stephens | |
| 6,344,922 B1 | 2/2002 | Grubb et al. | |
| 6,344,925 B1 | 2/2002 | Grubb et al. | |
| 6,356,383 B1 | 3/2002 | Cornwell, Jr. et al. | |
| 6,388,801 B1 | 5/2002 | Sugaya et al. | |
| 6,429,966 B1 | 8/2002 | Hazell et al. | |
| 6,466,362 B1 | 10/2002 | Friedrich | |
| 6,532,101 B2 | 3/2003 | Islam et al. | |
| 6,545,799 B1 * | 4/2003 | McNamara et al. .... | 359/337.11 |
| 6,587,259 B2 | 7/2003 | Islam et al. | |
| 6,587,261 B1 | 7/2003 | Stephens et al. | |
| 6,646,788 B2 | 11/2003 | Islam et al. | |
| 6,646,789 B2 * | 11/2003 | Kelkar et al. ............. | 359/337.1 |
| 6,665,114 B2 * | 12/2003 | Benjamin et al. ........... | 359/334 |
| 6,721,091 B2 | 4/2004 | Foursa et al. | |
| 6,760,150 B2 | 7/2004 | Goto et al. | |
| 6,829,083 B2 | 12/2004 | Terahara | |

(Continued)

FOREIGN PATENT DOCUMENTS

WO    WO 01/15368    3/2001

(Continued)

Primary Examiner—Eric Bolda
(74) Attorney, Agent, or Firm—Thorp Reed & Armstrong, LLP

(57) ABSTRACT

Optical systems of the present invention include first and second optical amplifiers that are operated individually to provide gain profiles that do not conform with a desired composite, or overall or total, gain profile, e.g., substantially flat, but to produce a desired composite noise figure profile, e.g., substantially flat or otherwise, for the amplifiers. Generally, the desired composite noise figure profile is produced, while attempting to minimize the deviation of the composite gain profile from the desired composite gain profile.

20 Claims, 4 Drawing Sheets

U.S. PATENT DOCUMENTS

| | | |
|---|---|---|
| 6,839,162 B2 | 1/2005 | Sekiya et al. |
| 6,961,502 B1 * | 11/2005 | Wysocki et al. ............ 385/129 |
| 7,260,126 B2 * | 8/2007 | Wang et al. .................. 372/30 |
| 2003/0161031 A1 | 8/2003 | Benjamin et al. |
| 2003/0169482 A1 | 9/2003 | Kung et al. |
| 2005/0219681 A1 | 10/2005 | Hayashi |

FOREIGN PATENT DOCUMENTS

| | | |
|---|---|---|
| WO | WO 03/087891 | 10/2003 |

* cited by examiner

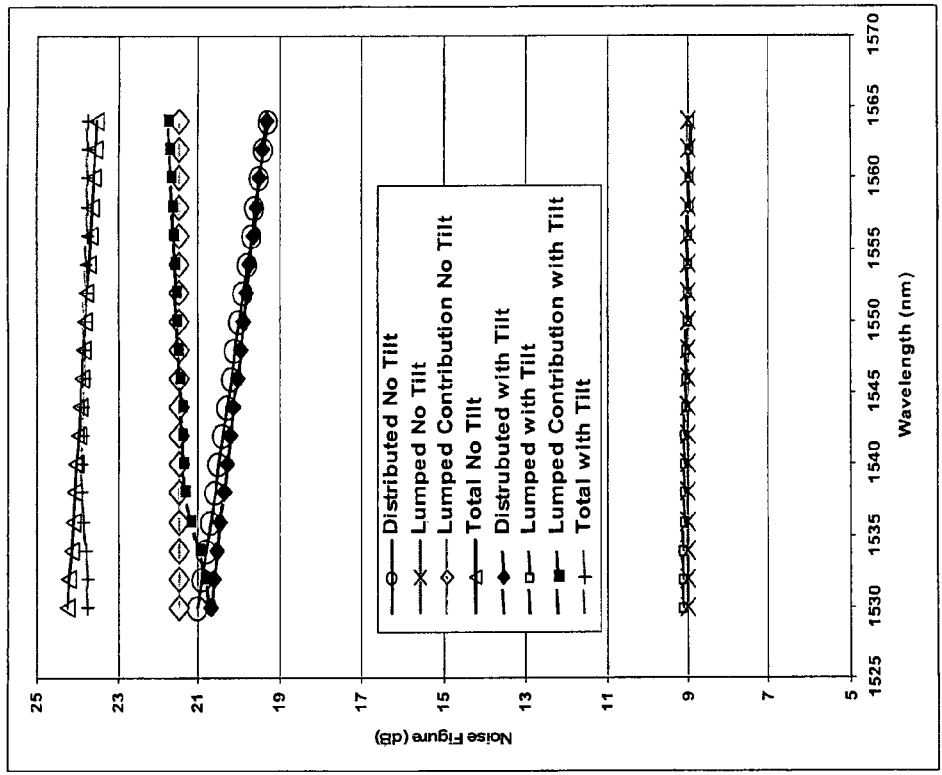
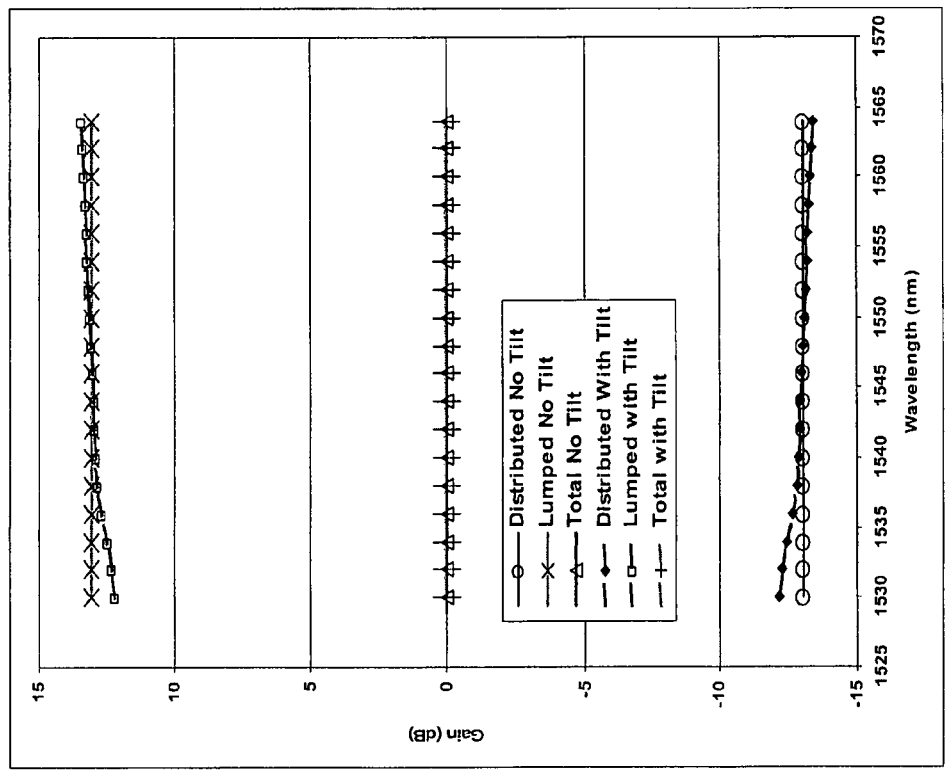
Fig. 4

OPTICAL COMMUNICATION SYSTEMS INCLUDING OPTICAL AMPLIFIERS AND AMPLIFICATION METHODS WITH FLAT NOISE FIGURE PROFILE

CROSS-REFERENCE TO RELATED APPLICATIONS

This application is a divisional application of U.S. patent application Ser. No. 11/061,579, filed Feb. 18, 2005, which claims priority from U.S. Provisional Patent Application Number 60/546,108, filed Feb. 19, 2004, both of which is incorporated by reference.

STATEMENT REGARDING FEDERALLY SPONSORED RESEARCH OR DEVELOPMENT

Not Applicable

BACKGROUND OF THE INVENTION

The present invention is directed generally to optical systems. More particularly, the invention relates to optical systems including optical amplifiers and methods for use therein.

The continued growth in traditional communications systems and the emergence of the Internet as a means for accessing and communicating information has accelerated demand for high capacity communications networks. Telecommunications service providers, in particular, have looked to wavelength division multiplexed ("WDM") transmission systems to increase the capacity of their optical fiber networks to meet the increasing demand.

In WDM transmission systems, distinct wavelength ranges that are useful for transmission through a transmission medium are allocated to carry separate information streams simultaneously within the medium. Analogously, distinct frequency ranges can be allocated to carry separate information streams in frequency division multiplexed ("FDM") systems. The wavelength/frequency ranges of WDM, FDM, and other systems carrying multiple information streams are often referred to signal wavelengths/frequencies, or signal channels. The ranges are characterized by a center wavelength/frequency, which is typically the mid-point of the wavelength/frequency range. The ranges also may be characterized in other manners, such as the wavelength/frequency of maximum power or a relative to reference wavelength/frequency.

In WDM systems, signal channels are transmitted using electromagnetic waves within the distinct wavelength ranges in the optical spectrum, typically in the infrared wavelength range. Each signal channel can be used to carry a single information stream or multiple information streams that are electrically or optically time division multiplexed ("TDM") together into a TDM information stream.

The pluralities of information carrying wavelengths are combined into a multiple channel, "WDM", optical signal that is transmitted in a single waveguide. In this manner, WDM and other multiple channel systems can increase the transmission capacity of space division multiplexed ("SDM"), i.e., single channel, optical systems by a factor equal to the number of channels in the multiple channel system.

The development of optical amplifiers greatly reduced the cost of optical systems, particularly multiple channel systems. The ability of optical amplifiers to amplify multiple optical signals simultaneously essentially eliminates the need and associated cost to separate and repeat each channel electrically and/or optically merely to overcome signal attenuation.

Optical amplifiers can be deployed either as distributed amplifiers or localized amplifiers. Both types of amplifiers can be used in a system to provide gain to overcome various losses in the system, such as fiber and component losses.

A distributed amplifier is designed to employ a portion of the transmission medium, typically optical fiber, as the amplifying medium, such that the amplification is distributed along the transmission fiber. The distributed amplification has the effect of lowering the net loss in the fiber, which improves the transmission performance, i.e., reach, of an optical transmission system.

A localized amplifier, also referred to as a lumped, concentrated, or discrete amplifier, is located at a discrete point in the network. Localized amplifiers are desirable, because they can provide high gain in a localized portion of the network to overcome high fiber and/or component losses in the network.

In some system configurations it is desirable to deploy both distributed and localized amplifiers, sometimes referred to as hybrid amplifiers, in order to meet the performance requirements of a system. The most common configurations employ distributed Raman amplifiers along with localized erbium doped fiber amplifiers ("EDFAs"), although localized Raman and other non-linear amplifiers and distributed erbium or other doped fiber amplifiers can be deployed.

A limitation in multiple channel transmission systems, including WDM systems, is that the performance of signal channels being transmitted through the system can vary significantly over the wavelength range used to transmit signal channels through the system. The use of multiple amplifier types, such as distributed and localized Raman and erbium amplifiers, in the network, while improving overall system performance can exacerbate the non-uniform system performance. The exacerbation is due to different amplifiers having different performance characteristics, such as gain and noise figure over a signal channel wavelength range, which can negatively impact uniform performance over the wavelength range.

The varying degradation mechanisms can result in diminished system performance over at least a portion of the signal channel range. The systems can be operated in a number of mode such as a uniform performance specification mode across the signal channel wavelength range or in a mode with varying performance specifications across the signal channel wavelength range. Either of these operational modes is often less than desirable. The former mode results can result in the added expense associated with premature regeneration of better performing signal channels to maintain uniform system performance. The latter mode can place significant constraints on the network planning, provisioning, and operations, because signal channels must be matched to individual circuits based on the length of the circuit and the performance of the signal channel in a particular portion of the network.

Most designs merely focus on making the performance of each amplifier type in the system operate as uniform as possible or conforming some other desired performance variation. The resultant variation is system performance is merely addressed by placing constraints on the operation of the system, as described above. Some newer amplifier designs have been developed that specifically attempt to address the variations in noise figure and/or gain variations in an amplifier, such as in U.S. Pat. No. 6,356,383, which is incorporated herein by reference.

In general, the problem remains that noise figure and/or gain variations in the performance of optical amplifiers in multiple channel transmission systems limits the overall system performance. As such, there is a continuing need to improve optical amplifiers, amplification methods, and optical systems employing such optical amplifiers to provide for higher capacity and longer distance transmission systems.

BRIEF SUMMARY OF THE INVENTION

The systems, apparatuses, and methods of the present invention address the above need for improved optical systems and optical amplifiers and amplification methods for use therein. Optical systems of the present invention include first and second optical amplifiers that are operated individually to provide gain profiles that do not conform with a desired composite, or overall or total, gain profile, e.g., substantially flat, but to produce a desired composite noise figure profile, e.g., substantially flat or otherwise, for the amplifiers. Generally, the desired composite noise figure profile is produced, while attempting to minimize the deviation of the composite gain profile from the desired composite gain profile.

The first optical amplifier can be configured to operate at different levels of first gain with an associated first noise figure over a signal channel wavelength range. The second optical amplifier can be configured to provide different levels of second gain with an associated second noise figure over a signal channel wavelength range. The present invention does not dictate that each amplifier have different or the same operating levels, which will most likely be defined to achieve various system objectives.

In the present invention, the first and second amplifiers are not necessarily operated individually to provide as uniform, i.e. flat, gain as possible over the signal wavelength range. The gain of each amplifier over the wavelength range generally is made non-uniform, so as to vary the noise figure over the wavelength range. The gain variations introduced by the optical amplifiers are selected in such a way to balance the composite noise figures of the two amplifiers, while also balancing the composite gain of the amplifiers. The net effect is a composite gain and noise figure that can be controllably varied across the entire signal wavelength spectrum or a portion thereof to address different conditions in the network and fiber plant.

The optical amplifiers can be concatenated at a discrete location and/or located at different locations in a network. For example, the optical amplifiers can be distributed and localized amplifiers, such as Raman and erbium, respectively, which serve as first and second optical amplifiers having first and second gain levels with associated noise figures.

In the case of a distributed Raman amplifier and localized erbium amplifier, each amplifier has its own gain and noise figure profile, the details of which depend upon the design of each amplifier. The various amplifiers and amplifier stages for that matter, each contribute to the composite gain and noise figure profile of the amplifier and the various profiles of the amplifiers can be used to achieve a desired composite gain and noise figure profile.

For example, in the above-referenced distributed Raman amplifier/localized erbium amplifier configuration, the noise figure and gain performance of portions of the signal wavelength spectrum can be varied in a manner that the variations can be offset by inducing variations in the Raman amplifier gain and noise figure profiles to produce the desired composite gain and noise figure profile. Again, in the present example, the erbium doped fiber used in the EDFA will have well defined gain and noise figure profiles as a function of pump power and the specific emission characteristics of the erbium doped fiber. Whereas, the gain and noise profile of the distributed Raman amplifier even within a specific amplifier can be varied quite a bit by controlling the pump powers being provided to the distributed Raman amplifier. These well defined gain and noise figure profiles are generally independent and, as such, can be manipulated in concert to achieve a composite gain profile.

Continuing the present example, the erbium amplifier could be operated with a higher gain and lower noise figure at one end of the signal wavelength spectrum, whereas the Raman amplifier could be operated with a lower gain and higher noise figure at one end of the signal wavelength spectrum. The net effect would be a composite gain and noise figure that can be controlled across the entire signal wavelength spectrum to a desired shape.

In the case of a distributed Raman amplifier and a localized EDFA, the noise figure of the distributed Raman amplifiers is more strongly dependent on the gain than in the EDFA. As such, the gain of the distributed Raman amplifier can be increased to flatten noise figure of the distributed Raman amplifier to the detriment of the gain profile flatness. But the EDFA gain can be varied in an opposite manner to flatten the composite gain and noise figures. The gain variation resulting from tilting the distributed Raman amplifier impacts that effective contribution of the lumped EDFA. The total noise figure with tilt can be significantly flattened relative total noise figure with each amplifier operated with flat gain.

In some embodiments, the optical amplifiers can employ the same amplification technique, whereas in other embodiments different amplification techniques might be required or desirable. For example, doped amplifiers, such as erbium, are often constrained in the gain and noise figure profiles based on the emissive characteristics of the dopant. As such, it may not be possible in some cases, to balance the noise figure and gain using EDFA as the $1^{st}$ and $2^{nd}$ amplifiers. Conversely, the noise figure and gain profiles of Raman amplifiers are not as constrained, although there is a tendency for the noise figure to be higher at the shorter wavelengths.

Various other amplifier types can be employed in the present invention, such as co- and/or counter pumped distributed and localized Raman amplifiers and EDFA employing one or more stages. For example, a two stage EDFA or two stage Raman amplifier can be used in a combination with at least one other optical amplifier.

In some instances the gain and noise figure profiles of various amplifiers do not vary in such a way as to readily allow for creating a desired composite gain and noise figure profile. In another aspect of the invention, the optical amplifiers can be used in combination with gain flattening filters, such as fiber Bragg gratings, and/or other components, i.e., "gain profile varying devices", to vary the relationship between the gain profile and the noise figure profile of the amplifier. Varying the gain and noise figure relationship of the amplifier allows the composite gain and noise figure profiles to be more easily tailored to meet specific system design requirements.

For example, the gain and noise figure profiles of an EDFA changes significantly with the amount of gain over the signal wavelength range. Gain profile varying devices can be used to flatten or otherwise vary the gain profile of the EDFA with a particular noise figure profile. The gain profile of the EDFA can then be varied to non-flat with a noise figure profile that would not otherwise be associated with that gain profile. The same technique can be done with Raman amplifiers, as well as other amplifiers. The gain profile varying devices would typically be used to introduce static variations in the gain profile to minimize operational complexity. However, dynamic varying devices could be used; for example, a tunable filter that operates over a portion or the entire signal channel wavelength range and can be controllably adjusted.

The gain profile varying device can be used with each amplifier, with each stage of an amplifier, and/or in combination with multiple amplifiers. For example, a fiber Bragg grating gain flattening filter ("GFF") can be used to flatten or otherwise vary the gain profile of a two stage EDFA. The gain flattening filter can be designed so the gain and noise figure of the EDFA can be varied to offset variations in a distributed Raman amplifier, which may be counter and/or co-pumped depending upon the design.

When the optical amplifiers are collocated at a discrete location, the optical amplifiers can be deployed as an optical amplifier assembly and treated separately or as part of or an entire network element. Conversely, the amplifiers can be diversely located and balance over the distance separating the amplifiers.

The present invention provides optical amplifiers with improved performance over a signal channel wavelength range, and, hence, improved optical transmission system performance. These advantages and others will become apparent from the following detailed description.

BRIEF DESCRIPTION OF THE DRAWINGS

Embodiments of the present invention will now be described, by way of example only, with reference to the accompanying schematic drawings for the purpose of illustrating embodiments only and not for purposes of limiting the same, wherein.

DESCRIPTION OF THE INVENTION

Figure 1:
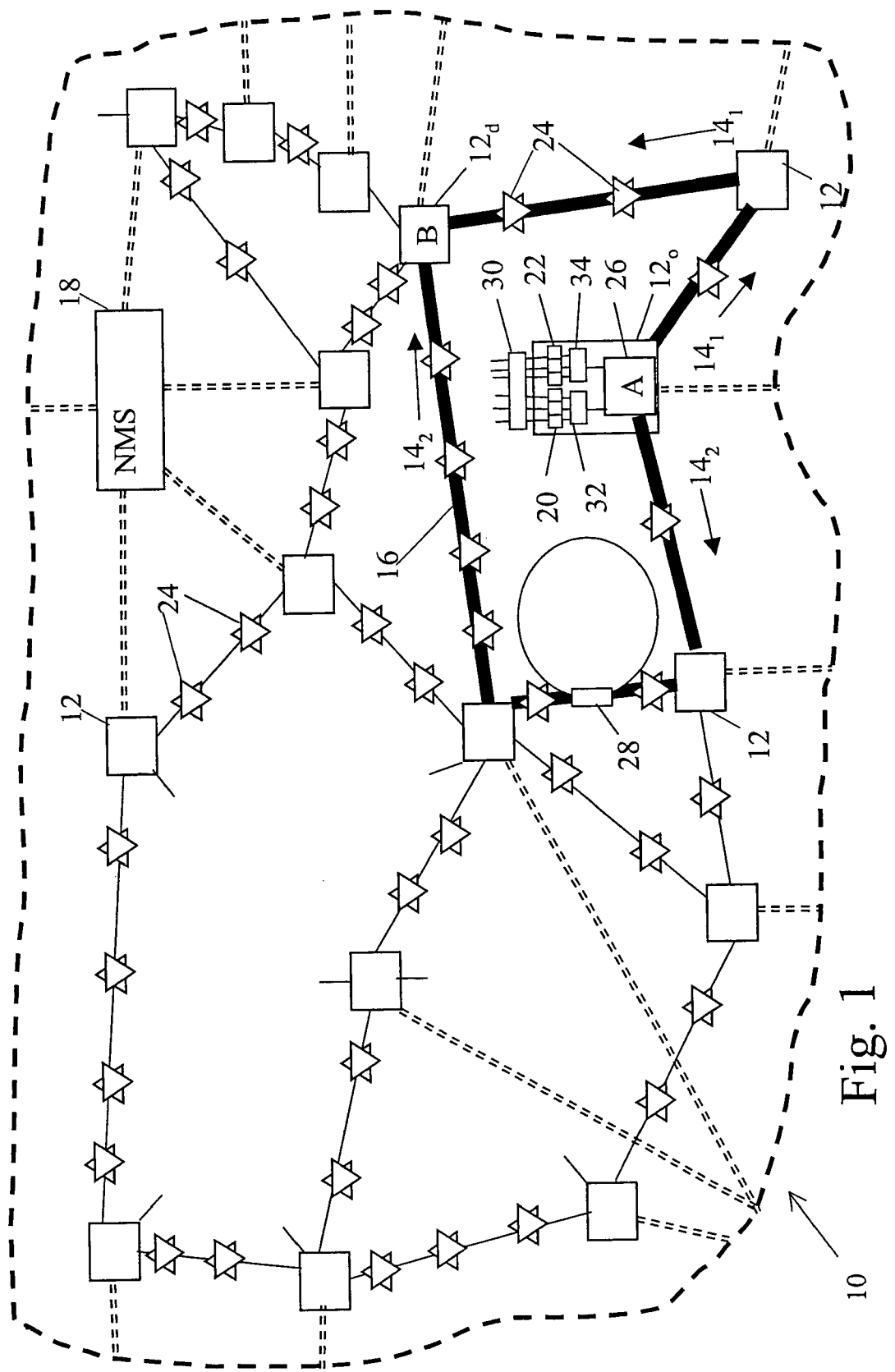
FIGS. 1 and 2 illustrate optical system embodiments.

FIG. 1 illustrates an optical system 10, which includes a plurality of nodes 12 connected by optical communication paths 14. Advantages of the present invention can be realized with many system 10 configurations, topologies, and architectures. For example, an all optical network, one or more interconnected point to point optical links (FIG. 2), and combinations thereof can be configured in various topologies, i.e., rings, mesh, etc. to provide a desired network connectivity.

The system 10 can support one or more transmission schemes, such as space, time, polarization, code, wavelength and frequency division multiplexing, etc., singly or in combination within a network to provide communication between the nodes 12. The system 10 can include various types of transmission media 16 and be controlled by a network management system 18.

As shown in FIG. 1, optical processing nodes 12 generally can include one or more optical components, such as transmitters 20, receivers 22, amplifiers 24, optical switches 26, optical add/drop multiplexers 28, and interfacial devices 30. For example, in WDM embodiments, the node 12 can include optical switches 26 and interfacial devices 30 along with multiple transmitters 20, receivers 22, and associated equipment, such as processors, monitors, power supplies, system supervisory and network and element management equipment, etc.

The optical processing nodes 12 can be configured via the network management system 18 in various topologies. For example, the deployment of integrated transport optical switches 26, and optical add/drop multiplexers 28 as integrated switching devices in intermediate nodes $12_i$ can provide all-optical interconnections between the transmitters 20 and receivers 22 located in non-adjacent origination and destination nodes, $12_o$ and $12_d$, respectively. The use of integrated transport switching devices in the system 10 in this manner provides for distance independent all-optical networks, sub-networks, and/or nodal connections.

In various network embodiments, multiple paths, e.g., $14_1$ and $14_2$, can be provided between nodes 12. The optical path 14 between adjacent nodes 12 is referred to generally as an optical link. The optical communication path 14 between adjacent optical components, typically optical amplifiers, along the link is referred to generally as a span.

Various guided and unguided transmission media 16, such as fiber, planar, and free space media, can be used to form the optical communication paths 14. The media 16 supports the transmission of information between originating nodes $12_o$ and destination nodes $12_d$ in the system 10. As used herein, the term "information" should be construed broadly to include any type of audio, video, data, instructions, or other signals that can be transmitted.

The transmission media 16 can include one or more optical fibers interconnecting the nodes 12 in the system 10. Various types of fiber, such as dispersion shifted ("DSF"), non-dispersion shifted ("NDSF"), non-zero dispersion shifted ("NZDSF"), dispersion compensating("DCF"), and polarization maintaining ("PMF") fibers, doped, e.g. Er, Ge, as well as others, can be deployed as transmission fiber to interconnect nodes 12 or for other purposes in the system 10. The fiber typically can support either unidirectional or bi-directional transmission of optical signals in the form of one or more information carrying optical signal wavelengths $\lambda_{si}$, or "channels". The optical signal channels in a particular path 14 can be processed by the optical components as individual channels or as one or more wavebands, each containing one or more optical signal channels.

Network management systems ("NMS") 18 can be provided to manage, configure, and control optical components in the system 10. The NMS 18 generally can include multiple management layers, which can reside at one or more centralized locations and/or be distributed among the optical components in the network. The optical components can be grouped logically as network elements for the purposes of network management. One or more network elements can be established at each optical component site in the network depending upon the desired functionality in the network and management system.

The NMS 18 can be connected directly or indirectly to network elements located either in the nodes 12 or remotely from the nodes 12. For example, the NMS 18 may be directly connected to network elements serving as a node 12 via a wide area or data communication network ("WAN" or "DCN", depicted via broken lines in FIG. 1). Indirect connections to network elements that are remote to the DCN can be provided through network elements with direct connections. Mixed data or dedicated supervisory channels can be used to provide connections between the network elements. The supervisory channels can be transmitted within and/or outside the signal wavelength band on the same medium or a different medium depending upon the system requirements.

The optical transmitters 20 transmit information as optical signals via one or more signal channels $\lambda_{si}$ through the transmission media 16 to optical receivers 22 located in other processing nodes 12. The transmitters 20 used in the system 10 generally include an optical source that provides optical power in the form of electromagnetic waves at one or more optical wavelengths. The optical source can include various coherent narrow or broad band sources, such as DFB and DBR lasers, sliced spectrum sources and fiber and external cavity lasers, as well as suitable incoherent optical sources, e.g., LED, as appropriate. The sources can have a fixed output wavelength or the wavelength can be tunable using various feedback and control techniques, such as temperature, current, and gratings or other components or means for varying the resonance cavity of the laser or output of the source.

Information can be imparted to the electromagnetic wave to produce an optical signal carrier either by directly modulating the optical source or by externally modulating the electromagnetic wave emitted by the source. Alternatively, the information can be imparted to an electrical carrier that can be upconverted, or frequency shifted, to an optical signal wavelength $\lambda_{si}$. Electro-optic (e.g., LiNbO$_3$), electro-absorption, other types of modulators and upconverters can be used in the transmitters 20.

In addition, the information can be imparted using various modulation formats and protocols. For example, various amplitude modulation schemes, such as non-return to zero (NRZ), differential encoding, and return to zero (RZ) using various soliton, chirped, and pulse technologies. Various frequency, phase, and polarization modulation techniques also can be employed separately or in combination. One or more transmission protocols, such as SONET/SDH, IP, ATM, Digital Wrapper, GMPLS, Fiber Channel, Ethernet, etc. can be used depending upon the specific network application. It will be appreciated that the transmitters 20 and receivers 22 can use one or more modulation formats and transmission protocols within the network.

The optical receiver 22 used in the present invention can include various detection techniques, such as coherent detection, optical filtering and direct detection, and combinations thereof. The receivers 22 can be deployed in modules that have incorporated wavelength selective demultiplexers to filter a specific channel from a WDM signal or channel demultiplexing can be performed outside of the receiver module. It will be appreciated that the detection techniques employed in the receiver 22 will depend, in part, on the modulation format and transmission protocols used in the transmitter 20.

Generally speaking, N transmitters 20 can be used to transmit M different signal wavelengths to J different receivers 22. Also, tunable transmitters 20 and receivers 22 can be employed in the optical nodes 12 in a network, such as in FIG. 1. Tunable transmitters 20 and receivers 22 allow system operators and network architects to change the signal wavelengths being transmitted and received in the system 10 to meet their network requirements. The transmitters 20 and receivers 22 can be adjusted dynamically using various feedback loops or operated independently.

Figure 2:
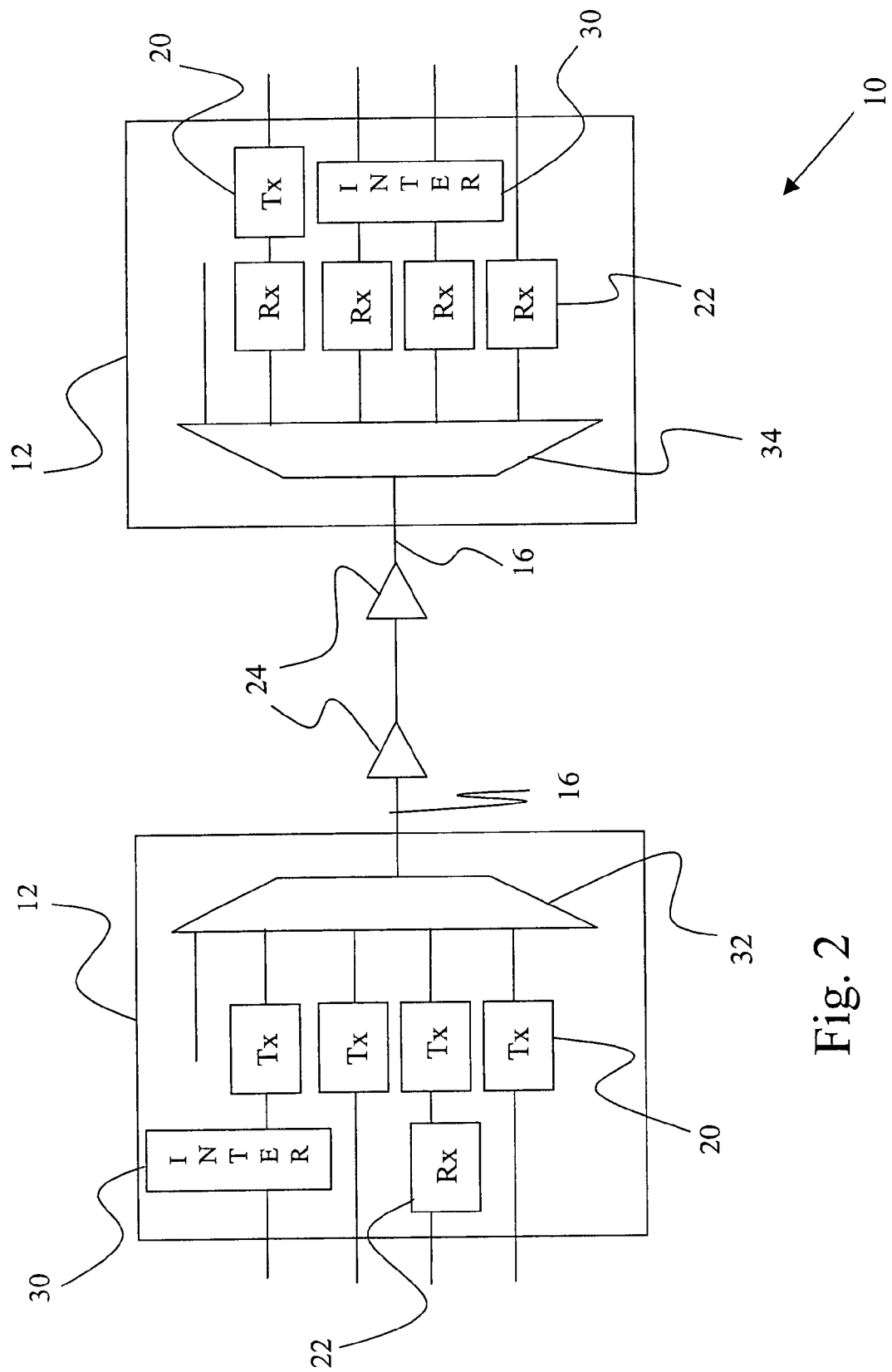

In addition, the transmitters 20 and receivers 22 can include various components to perform other signal processing, such as reshaping, retiming, error correction, differential encoding, protocol processing, etc. using serial and/or parallel techniques. For example, receivers 22 can be connected to the transmitters 20 in back to back configuration as a transponder or regenerator, as shown in FIG. 2. The back-to-back configuration can include various levels of functionality depending upon whether it serves as a 1R (repeat or retransmit), a 2R (reshape & repeat), or a 3R regenerator (reshape, retime, repeat).

In multiple channel systems, the transmitters 20 and receivers 22 can be operated in a uniform manner or the transmission and reception characteristics of the signal channels can be tailored individually and/or in groups. For example, pre-emphasis, optical and/or electrical pre- and post-dispersion and distortion compensation can be performed on each channel or groups of channels.

In FIG. 2, it will be appreciated that the transmitters 20 and receivers 22 can be used in multiple and single channel systems, as well as to provide short, intermediate, and/or long reach optical interfaces between other network equipment and systems. For example, transmitters 20 and receivers 22 deployed in a WDM system can be included on a module that includes standardized interface receivers and transmitters, respectively, to provide communication with interfacial devices 30, as well as other transmission and processing systems. In addition, the transmitters 20 and receivers 22 can be integrated into the input and output interfaces on interfacial devices 30.

The optical amplifiers 24 can be deployed periodically along optical links 15 to overcome attenuation that occurs in a span of transmission media 16. In addition, optical amplifiers 24 can be provided proximate to other optical components, for example, at the node 12 as booster/post-, interstage, and/or pre-amplifiers to provide gain to overcome component losses. The optical amplifiers 24 can include doped (e.g. Er, other rare earth elements, etc.) and non-linear interaction (e.g., Raman, Brillouin, etc.) fiber amplifiers that provide stimulated amplification. Various amplifiers and control schemes can be used in the present invention, such as those described in U.S. Pat. Nos. 6,115,174, 6,236,487, 6,344,922, 6,344,925 and PCT Application No. PCT/US03/11337, which are incorporated herein by reference.

Other types of optical amplifiers, such as semiconductor amplifiers, can be used in lieu of, or in combination with the fiber amplifiers. Two or more amplifiers 24 may be co-located and concatenated to provide additional flexibility. Each optical amplifiers 24 can include one or more serial and/or parallel stages that provide localized gain at discrete sites in the network and/or gain that is distributed along the transmission media 16. One or more other functions can be performed between the amplifiers and/or stages of the amplifiers. For example, optical regeneration, dispersion compensation, isolation, filtering, add/drop, switching, etc. can be included at a site along with the optical amplifiers 24.

Various types of optical switching devices, both optical switches 26 and OADMs 28, can be integrated into the nodes 12 and the all-optical networking functionality of the devices can be used to establish distance independent networks. The switching devices allow for integrated optical transport switching, adding, dropping, and/or termination of signal channels from multiple paths 14 entirely in the optical domain. The switching device eliminate the need for receivers 22 and transmitters 20 to perform electrical conversions, as required when using interfacial devices 30, merely to pass the information through intermediate nodes 12$_i$. As such, signal channels can optically pass through intermediate nodes 12$_i$ between the origin nodes 12$_o$ and destination nodes 12$_d$ bypassing the need for transmitters 20 and receivers 22 at the intermediate nodes 12$_i$. In this manner, the switching devices provide transparency through nodes that allows all-optical express connections to be established between non-adjacent origin and destination nodes in a network.

The signal channels optically passing through the switching devices can be distributed from a common path to multiple diverse paths, as well as combined from multiple diverse paths onto a common path. It will be appreciated that signal channels that are switched onto a common path by the switching devices from different paths can have different properties, such as optical signal to noise ratio. Conversely, signal channels entering the switching devices from a common path and exiting the devices via different paths may require that the signal channels exit with different properties, such as power level. As such, signal channels may have different span loss/gain requirements or tolerances within the link 15.

The optical switches 26 and OADMs 28 can be configured to process individual signal channels or signal channel groups or wavelength bands including one or more signal channels. The switching devices also can include various wavelength selective or non-selective switch elements, combiners 32, and distributors 34. The transmitters 20 and receivers 22 can be configured to transmit and receive signal channels dynamically through the switch elements or in a dedicated manner exclusive of the switch elements using various combiners 32 and distributors 34. The OADMs can include channel reusable and non-reusable configurations. Similarly, the switching devices can be configured to provide multicast capability, as well as signal channel terminations.

The switching devices can include various configurations of optical combiners 32 and distributors 34, such as channel multiplexers and demultiplexers, passive splitters and couplers described below, used in combination with various switch elements configured to pass or block the signals destined for the various other nodes 12 in a selective manner. The switching of the signals can be performed at varying granularities, such as line, group, and channel switching, depending upon the degree of system control and its associated cost desired in the system 10.

The switch element can include wavelength selective or non-selective on/off gate switch elements and/or variable optical attenuators having suitable extinction ratios. The switch elements can include single and/or multiple path elements that use various techniques, such as polarization control, interferometry, holography, etc. to perform the switching and/or variable attenuation function. The switching devices can be configured to perform various other functions, such as filtering, power equalization, dispersion compensation, telemetry, channel identification, etc., in the system 10.

Various two and three dimensional non-selective switch elements can be used in present invention, such as mechanical line, micro-mirror and other micro-electro-mechanical systems ("MEMS"), liquid crystal, holographic, bubble, magneto-optic, thermo-optic, acousto-optic, electro-optic (LiNbO$_3$), semiconductor, erbium doped fiber, etc. Alternatively, the switch. elements can employ fixed and tunable wavelength selective multi-port devices and filters, such as those described below. Exemplary switching devices are described in PCT Application No. PCT/US00/23051, which is incorporated herein by reference.

The interfacial devices 30 may include, for example, protocol and bit rate independent devices, such as optical switches and/or protocol and bit rate dependent electrical switch devices, such as IP routers, ATM switches, SONET add/drop multiplexers, etc. that operate at or between various networking layers (e.g., 1, 2, 3). The interfacial devices 30 can be configured to receive, convert, and provide information in one or more various protocols, encoding schemes, and bit rates to one or more transmitters 20, and perform the converse function for the receivers 22. The interfacial devices 30 also can be used as an input/output cross-connect switch or automated patch panel and to provide protection switching in various nodes 12 depending upon the configuration. The interfacial devices 30 can be electrically connected to the transmitters 20 and receivers 22 or optically connected using standard interface and/or WDM transmitters and receivers, as previously described.

Optical combiners 32 can be provided to combine optical signals from multiple paths into a multiple channel signal on a common path, e.g. fiber, such as from multiple transmitters 20 or in optical switching devices. Likewise, optical distributors 34 can be provided to distribute one or more optical signals from a common path to a plurality of different optical paths, such as to multiple receivers 22 and/or optical switching devices.

The optical combiners 32 and distributors 34 can include wavelength selective and non-selective ("passive") fiber, planar, and/or free space devices, as well as polarization sensitive devices. For example, one or more multi-port devices, such as passive, WDM, and polarization couplers having various coupling ratios, circulators, dichroic devices, prisms, diffraction gratings, arrayed waveguides, etc. can be employed used in the combiners 32 and distributors 34. The multi-port devices can be used alone, or in various combinations of filters, such as tunable or fixed, high, low, or band pass or band stop, transmissive or reflective filters, including Bragg gratings, Fabry-Perot, Mach-Zehnder, and dichroic filters, etc. Furthermore, one or more serial or parallel stages incorporating various multi-port device and/or filter combinations can be used in the combiners 32 and distributors 34 to multiplex, demultiplex, and multi-cast signal wavelengths $\lambda_i$ in the optical systems 10.

In the present invention, two or more optical amplifiers 24 are operated to provide a composite gain profile and associated noise figure profile over a signal channel wavelength range including the optical signal channels that is substantially spectrally flat or has some other desired spectral shape not provided by merely flattening or trying to achieve the spectral shape with each of the individual amplifiers. In various embodiments, the gain profiles of the amplifiers are varied to be non-flat, such that a composite noise figure profile of the amplifiers is produced that differs from a composite noise figure profile when the gain profiles of the optical amplifiers are substantially flat. It is generally desirable to vary the gain profiles of the individual amplifiers to be non-flat to produce a substantially flat composite gain profile and composite noise figure profile, e.g., ±1-2 dB, over the signal wavelength range of interest, if uniform system performance is the desired mode of operation. While perfectly flat profiles, 0 dB variation, would be desirable, there are practical limitations and uncertainties associated with achieving that goal. A more realistic goal is to not unduly limit the performance of any given channel, so limiting the profile to be within 1 dB is often an acceptable amount of variation.

In other instances, it could be desirable to vary the composite gain profile and noise figure profile to maximize the performance of less than all of the channels and even a select few channels in one or more portions of the signal channel wavelength range to the performance detriment of other channels. An example of such as scenario is when it is desirable to operate a small percentage of channels over a much longer distance than it is necessary to operate the remaining channels. In such instances, the channels can be grouped into two or more groups, each group being allocated for a different transmission distance. For example, the wavelengths toward the longer end of the wavelength range in the C-band, nominally ~1530-1565 or so, might be allocated for longer distance transmission, because distributed Raman amplifiers can be designed that have lower noise figures at the longer wavelengths more easily than at the shorter wavelengths. Channels in the shorter wavelength end of the range would be used for shorter distance transmission.

FIG. 3a-c shows various level depictions of optical amplifiers 24 in defining a span between the amplifiers. FIG. 3(a) provides a high level view of two distinct optical amplifiers that might be separated physically, as is the case with line amplifiers deployed between nodes 12 as shown in FIGS. 1 and 2.

Figure 3:
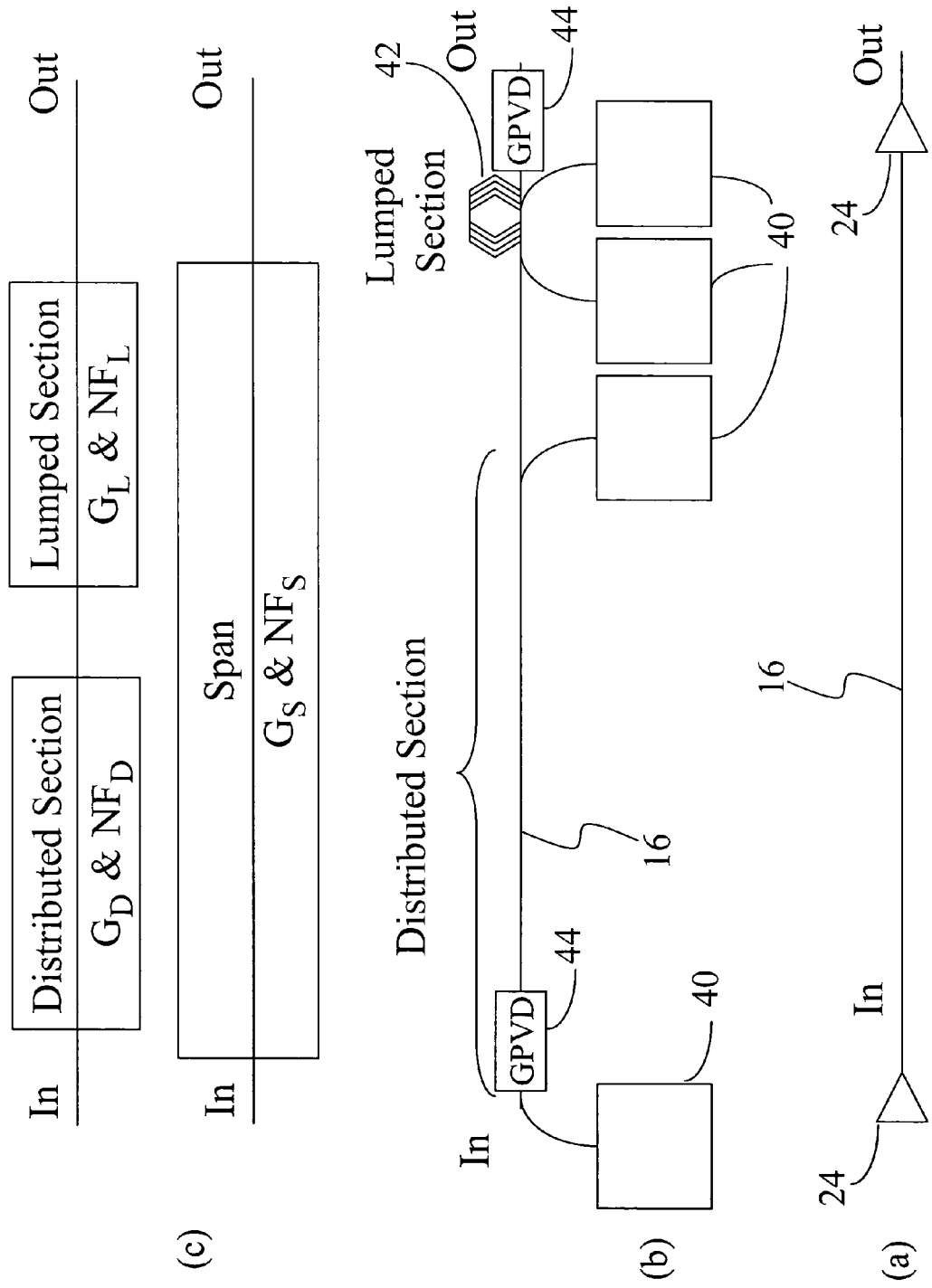
FIGS. 3(a-c) illustrate an various exemplary optical amplifier embodiments, and, FIG. 4 illustrates calculation results showing the effect of the present invention on the gain and noise figure profiles on an exemplary optical amplifier.

FIG. 3*b* shows a more detailed exemplary amplifier configuration that might be deployed in the amplifiers shown in FIG. 3(*a*). FIG. 3*b* shows a distributed amplifier, in which the transmission fiber 16 can be pumped with optical power, i.e., pump power, from a pump source 40 through combiners 32, so as to co- and/or counter-propagate with signal channels through the fiber. The distributed amplifier can be a Raman or doped amplifier. The pump source would generally include one or more optical sources, typically high power lasers. Also shown is a localized amplifier, which in this example is depicted as a coiled fiber 42, but could also be a different type of waveguide, e.g., an semiconductor optical amplifier ("SOA"), or other type of amplifier. The coiled fiber 42 can be an erbium or other doped fiber or fiber to facilitate Raman or other non-linear gain in the coiled fiber 42.

While the present invention can be applied with respect to many amplifier types and configuration, it is preferable to employ it with amplifier that have different gain and noise figure profiles. When the noise figure of said first amplifier contribute significantly toward, e.g., dominates, the composite noise figure of said first and second amplifiers and the gain profile of said first amplifier can be made non-flat in order to make the noise figure of said first amplifier substantially flat. The gain profile of said second amplifier then can be made non-flat to offset the non-flat gain profile of said first amplifier and to provide for a composite gain profile that is more flat than either of said first and second amplifiers.

In addition, gain profile varying devices 44 can be included in the optical amplifier design to modify the gain and noise figure profile relationship of one or more of the optical amplifiers. Gain profile varying devices 44 provide a means to alter the relationship between the gain and the noise profiles, so as to enable additional adjustment of the relative contributions of the individual gain and noise figure profiles to the overall composite profiles.

FIG. 3*c* provides a generalized block diagram of the distributed amplifier section and the localized amplifier section of the exemplary span shown in FIGS. 3(*a* & *b*). Each amplifier has its own gain profile and noise figure profile, which contribute to the composite, or overall, gain and noise figure for the span.

In general, the composite gain associated with a span of fiber can be described as:

$$G_S = G_D \times G_L \quad (1)$$

where, $G_S$=the composite gain associated with the span
$G_D$=the distributed gain in the span
$G_L$=the localized gain in the span,
with G being a function of wavelength and in linear units, e.g., (power out/power in)

Likewise, the noise figure can be described in a similar fashion as:

$$NF_S = NF_D + (NF_L - 1)/G_D \quad (2)$$

where, $NF_S$=the composite noise figure associated with the span
$NF_D$=the distributed noise figure in the span
$NF_L$=the localized noise figure in the span,
with NF being a function of wavelength in linear units, e.g., (Signal to Noise $(SNR)_{in}/SNR_{out}$).

In the present invention, a gain tilt can be introduced into the gain profile of the optical amplifier by varying the performance of the amplifier, such as by changing the total output power of the amplifier, which will impact the gain profile. If a gain tilt ($G_T$) is introduced into one or more of the amplifiers, for example, into a distributed amplifier, the inverse of the gain tilt can be introduced into the localized amplifier to maintain the composite gain profile, while varying the noise figure profile.

In general, the composite gain including tilt associated with a span of fiber, $G_{ST}$, can be described as:

$$G_{ST} = (G_D \times G_T)(G_L/G_T) \quad (3)$$

and the noise figure including tilt associated with a span of fiber can be described in a similar fashion as:

$$NF_{ST} = NF_{DT} + (NF_{LT} - 1)/(G_D \times G_T) \quad (4)$$

For small to moderate gain tilts $G_T$, $NF_{DT} \sim NF_D$ and $NF_{LT} \sim NF_L$, so the span noise figure including tilt can be approximated as:

$$NF_{ST} = NF_D + (NF_L - 1)/(G_D \times G_T) \quad (5)$$

Thus, by adjusting the spectral shape of $G_T$, the span noise figure can be adjusted to be spectrally flat or some other desired spectral shape.

As can be seen from the above equations, the gain tilt and the distributed gain can be varied to control the composite noise figure of the amplifier. By varying the gain profile of the distributed amplifier, i.e., the effective noise figure of the lumped amplifier can be controlled, as is evident from the above equation and is shown graphically in FIG. 4. Furthermore, if the gain tilt is selected, such that an inverse tilt could be applied to the lumped stage of the amplifier, the amplifier gain profile can be maintained, while the noise figure profile is adjusted.

In a more specific example of the gain tilt adjustment that can be made is provided with respect to a localized EDFA. The gain profile of the erbium can be described as:

$$G_T(\lambda) = 10^{(kT(\lambda)/10)} \quad (6)$$

where, $T(\lambda)$ is the erbium doped fiber ("EDF") Tilt Function in (dB/dB). The exponential constant k can be adjusted to the total noise of the EDFA in combination with another amplifier, such as a distributed Raman amplifier, to spectrally flatten or otherwise vary the composite gain and noise profiles of the amplifiers.

FIG. 4 shows calculation results of an exemplary embodiment for a distributed Raman amplifier used in combination with a localized EDFA. Plots (a) and (b) show the various gain and noise figure contributions, respectively, of the distributed and localized amplifiers to the composite gain for the cases of gain with and without tilt. In FIG. 4(*a*), curves 1-3 show the distributed (1) and localized (2) contributions and the composite (3) gain for a span, which is said to be zero when the span loss is perfected compensated by gain. In FIG. 4(*b*), curves 1-4 show the distributed (1) and localized (2 & 3) noise figure contributions and the composite (4) noise figure for the span. As can be seen, in the case of no tilt the gain can be made substantially flat, but the noise figure varies by approximately 1 dB over the wavelength range.

Applying the techniques of the present invention the noise figure and gain profile can be adjusted to achieve different composite profile, which in this example is a more spectrally flat noise figure profile. In FIG. 4(*a*), curves 4-6 show the distributed (4) and localized (5) contributions and the composite (6) gain for a span, which is said to be zero when the span loss is perfected compensated by gain. In FIG. 4(*b*), curves 5-8 show the distributed (5) and localized (6 & 7) noise figure contributions and the composite (8) noise figure for the span.

As can be seen, the gain profiles in both amplifiers were made less spectrally flat, while the composite gain profile was essentially maintained. The adjustments in gain profile resulted in a worsening of the localized amplifier noise figure flatness over the wavelength range. However, combined with the adjustments to the distributed gain and noise figure profiles, the resultant composite noise figure profile has been substantially flattened across the wavelength range.

In the above example, the both the distributed and. lumped gain profiles were varied from the desired flatness of the composite gain profile. In addition, the lumped noise figure was varied from the desired flatness of the composite noise profile. However, the gain profile of the distributed amplifier was varied, a gain tilt introduced, in a specific manner: 1) to change the distributed noise figure profile and the effective lumped noise figure profile, such that a desired composite noise figure was produced, and 2) that an approximate inverse of the gain tilt introduced into the distributed amplifier could be introduced into the lumped amplifier, which, of course, feeds back into the lumped amplifier noise figure and lumped contribution to the composite noise figure.

In practice, the present invention can be employed statically or dynamically depending upon the desired level of performance and the application. In a static configuration, the gain tilt can be implemented during manufacture or established in the field during turn up of the optical amplifiers, for example using techniques, such as those described in U.S. Pat. No. 6,587,261, which is incorporated herein by reference. The gain tilt can be adjusted during operation; however, care must be taken to not introduce instability into the system by varying the performance of the system at a rapid rate.

In some instances the gain and noise figure profiles of various amplifiers do not vary in such a way as to readily allow for creating a desired composite gain and noise figure profile. In another aspect of the invention, the optical amplifiers can be used in combination with gain flattening filters, such as fiber Bragg gratings, and/or other components, i.e., "gain profile varying devices", to vary the relationship between the gain profile and the noise figure profile of the amplifier. Varying the gain and noise figure relationship of the amplifier allows the composite gain and noise figure profiles to be more easily tailored to meet specific system design requirements.

For example, the gain and noise figure profiles of an EDFA changes significantly with the amount of gain over the signal wavelength range. Gain profile varying devices can be used to flatten or otherwise vary the gain profile of the EDFA with a particular noise figure profile. The gain profile of the EDFA can then be varied to non-flat with a noise figure profile that would not otherwise be associated with that gain profile. The same technique can be done with Raman amplifiers, as well as other amplifiers. The gain profile varying devices would typically be used to introduce static variations in the gain profile to minimize operational complexity. However, dynamic varying devices could be used; for example, a tunable filter that operates over a portion or the entire signal channel wavelength range and can be controllably adjusted.

The gain profile varying device can be used with each amplifier, with each stage of an amplifier, and/or in combination with multiple amplifiers. For example, a fiber Bragg grating gain flattening filter ("GFF") can be used to flatten or otherwise vary the gain profile of a two stage EDFA. The gain flattening filter can be designed so the gain and noise figure of the EDFA can be varied to offset variations in a distributed Raman amplifier, which may be counter and/or co-pumped depending upon the design.

In some system deployments, it may be desirable to implement the present invention at each discrete amplifier site, so the composite noise figure is controlled on a per site basis. However, as previously described, the present invention does not need to be implemented at all amplifiers at a site and not at all sites. For example, with some amplifier configurations, it may be more desirable to implement the present invention over two or more amplifier sites. Also, various automated amplifier control schemes can be implemented over a link including a plurality of amplifiers. An example of such techniques are described in U.S. Pat. No. 6,236,487.

Many of the examples provided herein are directed to amplifier configurations that have substantially flat gain and noise figure profile, because of the utility of amplifiers with such profiles in multiple channel transmission system. As previously described, the gain and noise figure profiles can be tailored to have other desired shapes to achieve various system objectives. For example, systems can be designed to provide substantially different performance over a wavelength range, so as to provide significantly greater performance in one portion of the spectrum, while providing some lesser performance in other portions of the spectrum. In addition, it will be recognized that the gain and noise figure profiles can have different desired shapes to meet a particular system design objective.

It will be appreciated that the present invention provides for improved optical amplifiers and amplification methods and optical transmission systems including such optical amplifiers. Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. An optical system comprising:
   at least one first transmitter;
   at least one first receiver connected to the at least one transmitter by at least one optical fiber;
   a first optical amplifier including at least one first pump source to amplify optical signals being transmitted from said first transmitter to said first receiver, wherein said first optical amplifier has a first substantially flat gain profile and associated first noise figure profile over a signal channel wavelength range including said optical signals;
   at least a second optical amplifier including at least one second pump source configured to amplify optical signals being transmitted from said first transmitter to said first receiver, wherein said second optical amplifier has a second substantially flat gain profile and associated second noise figure profile over the signal channel wavelength range including said optical signals,
   a first gain profile varying device in combination with said first optical amplifier such that said first gain profile is varied to a non-flat first gain profile and to a non-flat first noise figure profile; and
   a second gain profile varying device in combination with said second optical amplifier such that said second gain profile is varied to a non-flat second gain profile and to a non-flat second noise figure profile, such that a composite noise figure profile of the first and second non-flat noise figure profiles is substantially flat over the signal channel wavelength range and differs from a composite noise figure profile when the first and second gain profiles are substantially flat over the signal channel wavelength range.

2. The system of claim 1, wherein said first and second optical amplifiers are configured to produce a composite gain and noise figure profile that varies by less than 2 dB over the signal channel wavelength range.

3. The system of claim 1, wherein said first and second optical amplifiers are configured to produce a composite gain and noise figure profile that varies by less than 1 dB over the signal channel wavelength range.

4. The system of claim 1, wherein said first optical amplifier is Raman fiber amplifier that is configured to increase the gain variation over the signal channel wavelength range and decrease the noise figure variation relative to that for a flat gain profile.

5. The system of claim 4, wherein said first optical amplifier is distributed Raman amplifier that is configured to provide more gain at the shorter wavelengths in the signal channel wavelength range and said second amplifier is a an erbium doped fiber amplifier configured to provide less gain at the shorter wavelengths in the signal channel wavelength range.

6. The system of claim 1, wherein said first optical amplifier is a distributed Raman amplifier and said second optical amplifier is a localized erbium amplifier.

7. The system of claim 6, wherein said Raman amplifier provides amplifying pump power that is counterpropagating relative to the signal channel direction of travel in the fiber.

8. The system of claim 1, wherein said first and second optical amplifier comprise an optical amplifier assembly and said optical amplifier assembly is one of a plurality of optical amplifier assemblies configured to amplify optical signals being transmitted from said at least one first transmitter to said at least one first receiver.

9. The system of claim 8, wherein said plurality of optical amplifier assemblies provide substantially the same composite gain and noise figure profiles.

10. The system of claim 8, wherein said plurality of optical amplifier assemblies provide link composite gain and noise figure profile that are different than the composite gain and noise figure profiles of said plurality of optical amplifier assemblies.

11. The system of claim 1, wherein at least one first transmitter and said at least one first receiver are one of a plurality of optical transmitters and optical receivers, respectively.

12. The system of claim 1, wherein said system includes at least one gain profile varying device configured to vary the relationship between the gain profile and noise figure profile of one of the first and second optical amplifiers.

13. The system of claim 12, wherein said gain profile varying device is a fiber Bragg grating gain flattening filter configured to vary the gain profile of at least one of said first and second optical amplifiers over at least a portion of the signal channel wavelength range.

14. A method of configuring optical amplifiers comprising:
providing first and second optical amplifiers;
configuring the first optical amplifier to have a first non-flat gain and noise figure profile over a signal channel wavelength range; and,
configuring the second optical amplifier to have a second non-flat gain and noise figure profile over the signal channel wavelength range that is tailored to offset the first non-flat gain and noise figure profile to produce a substantially flat composite gain and noise figure profile differing from either of the first and second gain and noise figure profiles.

15. The method of claim 14, wherein the noise figure of said first amplifier significantly contributes toward the composite noise figure of said first and second amplifiers and the gain profile of said first amplifieris made non-flat in order to make the noise figure of said first amplifier substantially flat and the gain profile of said second amplifier is made non-flat to offset the non-flat gain profile of said first amplifier to provide for a composite gain profile that is more flat than either of said first and second amplifiers.

16. An optical system comprising:
at least one first transmitter;
at least one first receiver connected to the at least one transmitter by at least one optical fiber;
an optical amplifier assembly including:
first and second optical amplifier, wherein the first amplifier includes at least one first pump source, and the second amplifier includes at least one second pump source, and wherein the first and second amplifiers are configured to amplify optical signals being transmitted from said first transmitter to said first receiver, wherein said optical amplifier assembly has a composite gain profile and composite noise figure profile and said first and second optical amplifiers having respective gain profiles and noise figure profiles, and
a first gain profile varying device in combination with said first optical amplifier such that said first gain profile is varied to make the first gain profile more non-flat and to make the first noise figure profile more non-flat and the gain profile of the first amplifier is varied to change the noise figure profile of the second amplifier, and so that the gain profile of the first amplifier is different than the composite gain profile, thereby producing the composite noise profile; and
a second gain profile varying device in combination with said second optical amplifier such that said second gain profile is varied to make the second gain profile more non-flat and to make the first noise figure profile more non-flat, the gain profile of the second amplifier is varied to produce, in combination with the first amplifier, the composite noise profile, and wherein the composite noise profile is substantially flat over the signal channel wavelength range.

17. The system of claim 16, wherein the first optical amplifier is a distributed Raman amplifier, the second optical amplifier is a lumped erbium amplifier and the first optical amplifier gain profile is tilted to vary according to the inverse of the second optical amplifier erbium doped fiber tilt function.

18. The system of claim 16, wherein composite gain and noise figure profile are substantially flat to within 1 dB over the signal channel spectrum.

19. The system of claim 16, wherein a composite noise figure profile of the first and second non-flat noise figure profiles is substantially flat over the signal channel wavelength range and differs from a composite noise figure profile when the first and second gain profiles are substantially flat over the signal channel wavelength range.

20. The system of claim 1, wherein a composite noise figure profile of the first and second non-flat noise figure profiles is substantially flat over the signal channel wavelength range and differs from a composite noise figure profile when the first and second gain profiles are substantially flat over the signal channel wavelength range.

* * * * *

UNITED STATES PATENT AND TRADEMARK OFFICE
CERTIFICATE OF CORRECTION

| | |
|---|---|
| PATENT NO. | : 7,522,334 B2 |
| APPLICATION NO. | : 11/804100 |
| DATED | : April 21, 2009 |
| INVENTOR(S) | : Thomas D. Stephens |

It is certified that error appears in the above-identified patent and that said Letters Patent is hereby corrected as shown below:

Column 16, ln. 2, delete "amplifieris" and insert -- amplifier is --.

Signed and Sealed this

Eighth Day of December, 2009

David J. Kappos
*Director of the United States Patent and Trademark Office*